United States Patent
Kanazawa

(10) Patent No.: US 11,327,058 B2
(45) Date of Patent: May 10, 2022

(54) PEAK DETECTION METHOD AND DATA PROCESSING DEVICE

(71) Applicant: SHIMADZU CORPORATION, Kyoto (JP)

(72) Inventor: Shinji Kanazawa, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 674 days.

(21) Appl. No.: 16/089,521

(22) PCT Filed: Mar. 31, 2016

(86) PCT No.: PCT/JP2016/060677
§ 371 (c)(1),
(2) Date: Sep. 28, 2018

(87) PCT Pub. No.: WO2017/168682
PCT Pub. Date: Oct. 5, 2017

(65) Prior Publication Data
US 2019/0113486 A1 Apr. 18, 2019

(51) Int. Cl.
*G01N 30/86* (2006.01)

(52) U.S. Cl.
CPC ......... *G01N 30/8631* (2013.01); *G01N 30/86* (2013.01)

(58) Field of Classification Search
CPC ........................... G01N 30/86; G01N 30/8631
See application file for complete search history.

(56) References Cited

U.S. PATENT DOCUMENTS

| 4,752,888 A | * | 6/1988 | Yoshihara | G06K 9/0053 |
| | | | | 702/32 |
| 7,982,181 B1 | * | 7/2011 | Senko | G01N 30/8631 |
| | | | | 250/282 |

(Continued)

FOREIGN PATENT DOCUMENTS

| JP | 06-331575 A | 12/1994 |
| JP | 07-098270 A | 4/1995 |

(Continued)

OTHER PUBLICATIONS

Shimizu, Machine translation of JP 08-035960, Feb. 6, 1996 (Year: 1996).*

(Continued)

*Primary Examiner* — Yoshihisa Ishizuka
(74) *Attorney, Agent, or Firm* — Sughrue Mion, PLLC

(57) ABSTRACT

A peak detecting method according to the present invention includes a first peak detecting step (S1) of detecting, with a first detection sensitivity, one or more peaks in object data whose peak is to be detected; and a second peak detecting step (S5) of detecting one or more peaks in the object data with a second detection sensitivity that is different from the first detection sensitivity. With this method, since two kinds of detection are performed at the different detection sensitivities, a shoulder peak (or a non-shoulder peak) candidate can be chosen from peaks that are detected with one of the detection sensitivities but are not detected with the other detection sensitivity, and thus, a shoulder peak can be appropriately detected with ease.

6 Claims, 4 Drawing Sheets

(56) References Cited

U.S. PATENT DOCUMENTS

| | | | | |
|---|---|---|---|---|
| 2002/0052701 A1* | 5/2002 | Gorenstein | ........ | G01N 30/8603 702/74 |
| 2003/0059837 A1* | 3/2003 | Levinson | ............... | G16C 20/64 435/7.1 |
| 2012/0089344 A1* | 4/2012 | Wright | ............... | G01N 30/8624 702/32 |
| 2015/0206728 A1* | 7/2015 | Kaneko | ............... | H01J 49/0036 250/282 |

FOREIGN PATENT DOCUMENTS

| | | |
|---|---|---|
| JP | 08-035960 A | 2/1996 |
| JP | 2015-049136 A | 3/2015 |

OTHER PUBLICATIONS

International Search Report for PCT/JP2016/060677, dated May 24, 2016.
Office Action dated Feb. 25, 2020, from the China National Intellectual Property Administration in Machine Application No. 201680084121.6.

* cited by examiner

PEAK DETECTION METHOD AND DATA PROCESSING DEVICE

This Application is a National Stage of International Application No. PCT/JP2016/060677 filed Mar. 31, 2016.

TECHNICAL FIELD

The present invention relates to a peak detecting method based on, for example, a chromatogram obtained by chromatography or a spectrum obtained by a mass spectroscope, a spectrometer, or the like, and a data processing device for implementing the method.

BACKGROUND ART

Chromatograph is one of devices for analyzing components contained in a sample. In a chromatograph, a sample is introduced into a column with a flow of a mobile phase, and the components contained in the sample are timewise separated in the column, followed by detecting by a detector, thereby creating a chromatogram. Then, each of the components is identified based on the position of a peak on the chromatogram, and thus, the concentration of each of the components is determined based on the height or area of the peak (for example, Patent Literature 1).

In the case where a sample contains a plurality of components having a similar retention time, a plurality of peaks corresponding to the plurality of components may be superimposed one on another in the chromatogram. FIGS. 5A and 5B show an example of the chromatogram in the aforementioned case. Broken lines in FIGS. 5A and 5B indicate chromatographic profiles in the case where two peaks exist independently of each other; and the solid line indicates a chromatographic profile in the case where the two peaks are superimposed one on another. In FIGS. 5A and 5B, the respective profiles of the two peaks are the same, and the difference in the retention times of the two peaks in FIG. 5B is smaller than that in FIG. 5A. In FIG. 5A, respective peak tops appear although the two peaks are superimposed one on another. In contrast, in FIG. 5B, the chromatogram monotonically decreases apart from the peak top of the entire profile, although the profile has a slight bulge near the peak top of a smaller peak (designated by reference numeral 91 in FIG. 5B), thereby making it difficult to clearly find the smaller peak. In the present specification, a peak located at a position at which the chromatogram monotonically decreases apart from the peak tops of a plurality of peaks while the plurality of peaks are superimposed one on another is referred to as a "shoulder peak".

CITATION LIST

Patent Literature

Patent Literature 1: JP H07-098270 A
Patent Literature 2: JP 2015-049136 A

SUMMARY OF INVENTION

Technical Problem

Many devices or programs for processing data on a chromatogram automatically detect peaks having an S/N (signal/noise) ratio of a predetermined threshold value or higher in the chromatogram (see, for example, Patent Literature 2). Here, a shoulder peak can be detected by decreasing the threshold value. However, if the threshold value is decreased too much, noise may be erroneously detected as a peak. Although a true peak and noise can be visually distinguished from each other in many cases, it is troublesome to find a true peak if there are too many erroneously detected peaks. In contrast, in the case where the threshold value of the S/N ratio is increased, no shoulder peak may be detected.

Explanation has been made for a chromatogram so far. A mass spectrum obtained by a mass spectroscope in combination with a chromatograph or an optical spectrum obtained by a spectrometer contains a similar problem.

A problem to be solved by the present invention is to provide a peak detecting method and a data processing device suitable for detecting a shoulder peak.

Solution to Problem

In order to solve the above-described problem, a peak detecting method according to the present invention includes: a first peak detecting step of detecting, with a first detection sensitivity, one or more peaks in object data in which a peak is to be detected; and a second peak detecting step of detecting one or more peaks in the object data with a second detection sensitivity that is different from the first detection sensitivity.

In the peak detecting method according to the present invention, one or more peaks are detected in the second peak detecting step with the second detection sensitivity that is different from the first detection sensitivity in the first peak detecting step. In the case where the second detection sensitivity is higher than the first detection sensitivity, a peak that is not detected in the first peak detecting step can be detected in the second peak detecting step, and thus, a shoulder peak can be detected with ease. In contrast, in the case where the second detection sensitivity is lower than the first detection sensitivity, some of the peaks that are detected in the first peak detecting step are not detected in the second peak detecting step, and thus, noise or the like that is erroneously recognized as a shoulder peak can be excluded.

In the case where the second detection sensitivity is higher than the first detection sensitivity, the peak detecting method may include a shoulder peak candidate choosing step of choosing, out of the one or more peaks detected in the second peak detecting step, a peak that is not detected in the first peak detecting step. With this configuration, in the shoulder peak candidate choosing step, a rather apparent peak that is detected with a relatively low first detection sensitivity is excluded from the one or more peaks detected in the second peak detecting step using a higher second detection sensitivity, and then, one or more peaks that are not detected in the first peak detecting step are chosen. In this manner, a shoulder peak candidate or candidates which can be a shoulder peak or peaks are obtained. The resultant shoulder peak candidates include noise or the like other than a true shoulder peak. However, since candidates are narrowed down, a true shoulder peaks can be distinguished easily from noise or the like.

In contrast, in the case where the second detection sensitivity is lower than the first detection sensitivity, the peak detecting method may include a shoulder peak exclusion candidate choosing step of choosing a peak that is not detected in the second peak detecting step from one or more peaks detected in the first peak detecting step. With this configuration, in the shoulder peak exclusion candidate choosing step, a rather apparent peak that is detected with the relatively low second detection sensitivity is excluded from the one or more peaks detected in the first peak detecting step using the higher first detection sensitivity, and then, a peak or peaks that are not detected in the second peak detecting step are chosen. In this manner, a shoulder peak non-candidate having a possibility of not a shoulder peak but noise or the like can be obtained. The shoulder peak exclusion candidate contains a true shoulder peak. However, since candidates are narrowed down, a true shoulder peak can be easily distinguished from noise or the like.

It is desirable that either one or both of the first detection sensitivity and the second detection sensitivity can be set by a user in the peak detecting method according to the present invention. In this manner, the user can appropriately change the first detection sensitivity and the second detection sensitivity while looking at the choosing result of the shoulder peak candidates so as to readily choose a true shoulder peak.

A data processing device according to the present invention includes: a first peak detecting part for detecting, with a first detection sensitivity, one or more peaks in object data in which peak is to be detected; and a second peak detecting part for detecting one or more peaks in the object data with a second detection sensitivity that is different from the first detection sensitivity. Each of these component parts may be embodied by a central processing unit (CPU), a memory, software, or the like in a computer.

Advantageous Effects of Invention

According to the present invention, since two kinds of detection are performed with different detection sensitivities, the shoulder peak (or the shoulder peak exclusion) candidate can be chosen from the peaks that are detected with one of the detection sensitivities but are not detected with the other detection sensitivity, and thus, the shoulder peak can be appropriately detected with ease.

DESCRIPTION OF EMBODIMENTS

Referring to FIG. 1 to FIG. 4, embodiments of the peak detecting method and the data processing device according to the present invention are described. In the present embodiment, candidates of a shoulder peak are chosen based on a chromatogram in accordance with procedures shown in a flowchart of FIG. 2 using a data processing device 10 shown in FIG. 1.

Figure 1:
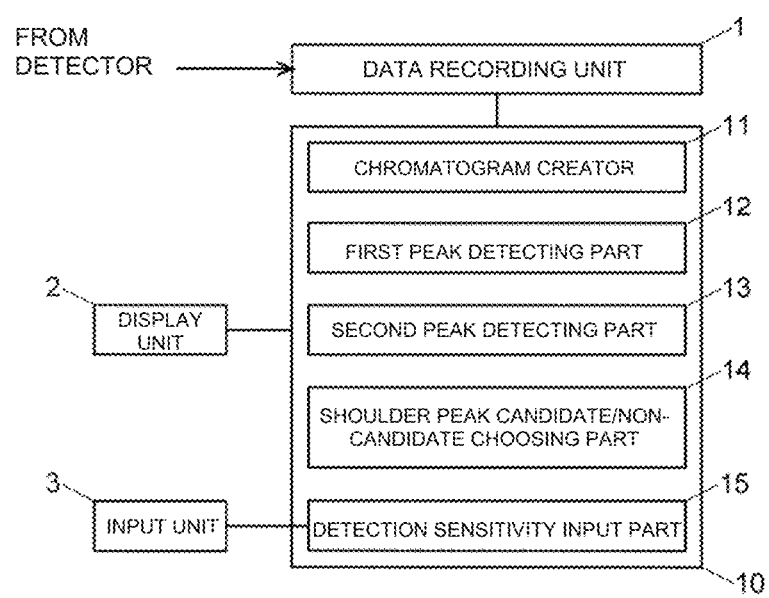
FIG. 1 is a constitutional diagram schematically illustrating one embodiment of a data processing device according to the present invention.
Figure 2:
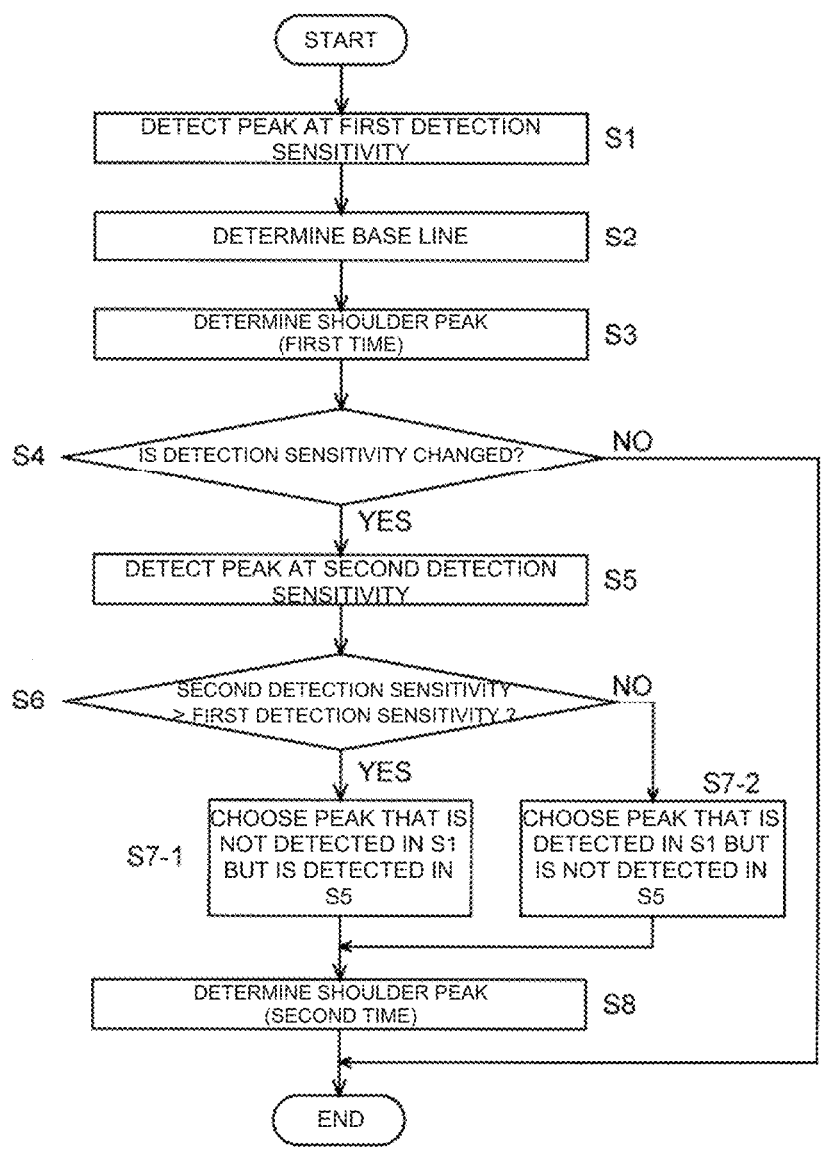
FIG. 2 is a flowchart illustrating one embodiment of a peak detecting method according to the present invention.

The data processing device 10 in the present embodiment is used together with a data recording unit 1, an input unit 3, and a display unit 2. The data recording unit 1 is adapted to record data obtained by measurement by a detector provided for a liquid chromatograph, a gas chromatograph, or the like, and includes a hard disk, a memory, and the like. Although the data recording unit 1 shown in FIG. 1 is disposed outside of the data processing device 10, it may be disposed inside of the data processing device 10. The display unit 2 is designed to display information whose data is being processed by the data processing device 10 or the result of the data processing. The input unit 3 is adapted to input information required by a user, described later, into the data processing device 10, and is exemplified by a keyboard, a mouse, or the like.

The data processing device 10 includes a chromatogram creator 11, a first peak detecting part 12, a second peak detecting part 13, a shoulder peak candidate/non-candidate choosing part 14, and a detection sensitivity input part 15. Each of these components is actually embodied by hardware such as a CPU or a memory in a computer or software. Hereinafter, the function of each component part of the data processing device 10 and the peak detecting method in the present embodiment will be described with reference to the flowchart of FIG. 2 and a window 20, illustrated in FIG. 3 and FIG. 4, displayed on the display unit. Here, although description is made on an example in which a shoulder peak candidate of a chromatogram is chosen, a shoulder peak candidate of a spectrum is chosen in the same manner, unless otherwise specified.

Prior to peak detecting, the chromatogram creator 11 acquires data from the data recording unit 1, and then, creates a chromatogram in a method similar to a conventional method. In the case of processing of a peak of a spectrum, no creation of a chromatogram is needed, and thus, data is only required to be acquired from the data recording unit 1.

Figure 3:
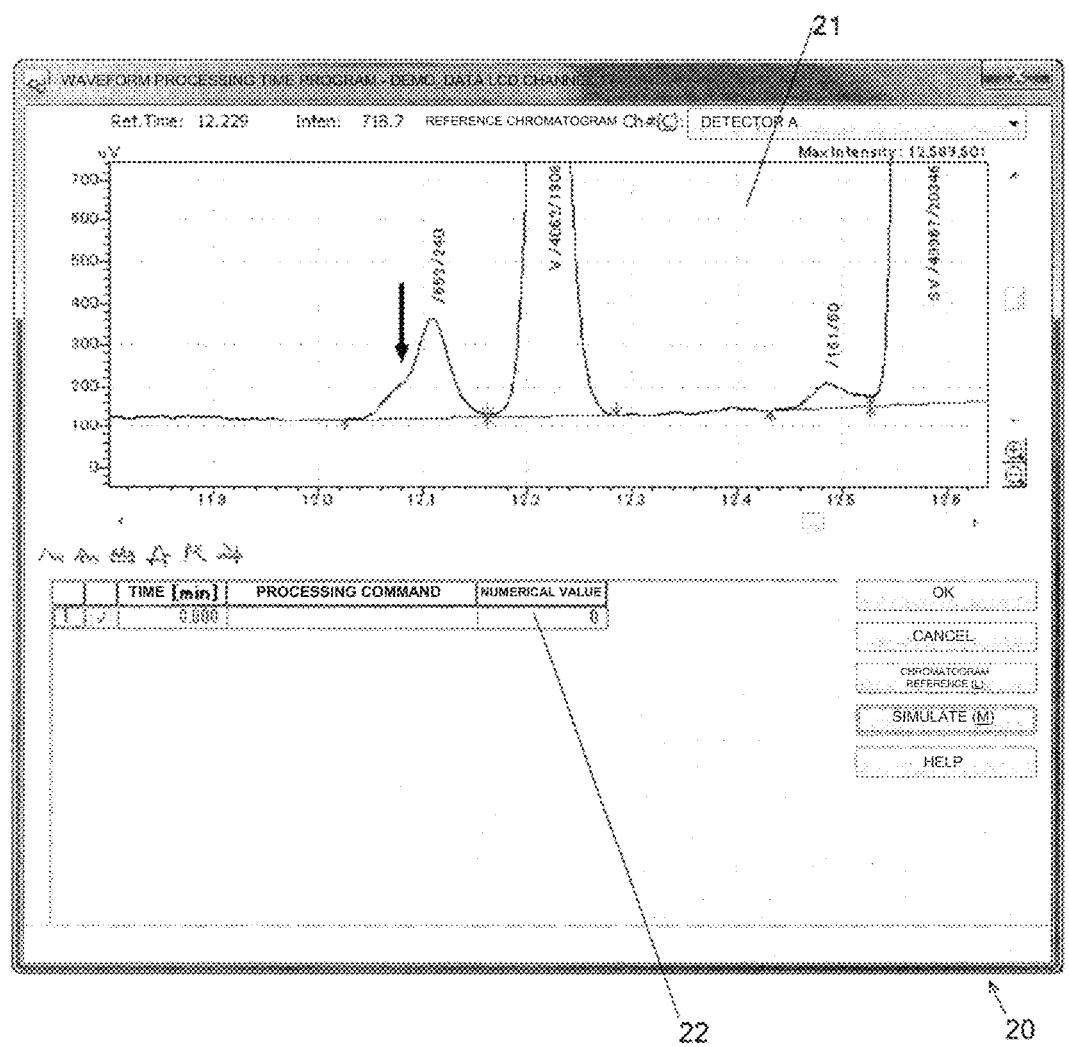
FIG. 3 is a diagram illustrating a screen of a display unit that displays an example of detection of a peak at a first detection sensitivity.

First, the first peak detecting part 12 detects a peak from the created chromatogram with a first detection sensitivity in Step S1. The first detection sensitivity depends upon the numerical value of an S/N ratio. The numerical value of the first detection sensitivity may be input into the detection sensitivity input part 15 by a user via the input unit 3, or may be a fixed value. The peak is detected by a method similar to the conventional method. For example, assuming that a temporary peak is located at a point where the chromatogram has a maximum value or at a point of inflection, if the S/N ratio of the temporary peak is equal to or higher than (the numerical value of the S/N ratio as) the first detection sensitivity, the temporary peak is detected as an actual peak. In contrast, if the S/N ratio of the temporary peak is lower than the first detection sensitivity, the temporary peak is not detected as an actual peak. Here, the peak detection in Step S1 may be performed with respect to the entire created chromatogram or only within a retention time designated by a user via the input unit 3. As illustrated in, for example, FIG. 3, the detected peak is indicated by marking the position of a peak top or assigning a numerical value to the peak top on the chromatogram displayed on the chromatogram display 21 of the window 20. A bold downward arrow in FIG. 3 is given for the sake of explanation, described later, but does not indicate the detected peak.

Next, the base line of the chromatogram is determined based on the peak detected in Step S1 (Step S2). Although this determination of the base line is not indispensable in the data processing method according to the present invention, it is normally made in the data processing of a chromatogram. The base line is determined by a method similar to the conventional method. For example, as a retention time elapses, a point at which the absolute value of an inclination of the chromatogram takes a predetermined value or higher is referred to as a peak start point, and furthermore, a point at which the absolute value of the inclination (having a minus inclination) is decreased after it is increased past the peak top, and then, takes a predetermined value or lower is referred to as a peak end point. A straight line connecting the peak start point to the peak end point is referred to as a base line between the two points.

Subsequently, it is determined whether the peaks other than the definitely true peaks out of the peaks detected in Step S1 are shoulder peaks or peaks other than the shoulder peaks such as noise (Step S3). This determination is visually performed by a user in the present embodiment.

Next, the detection sensitivity input part 15 enables a user to input a change in sensitivity of the peak via the input unit 3 (Step S4). More specifically, for example, a message like "Change in detection sensitivity? Yes/No" is displayed on a screen of the display unit 2, and then, a user selects "Yes" or "No" via the input unit 3. Alternatively, an input column, in which the numerical value of detection sensitivity is input, is displayed on a screen of the display unit 2, and then, detection sensitivity may be changed when a user inputs a numerical value in the input column via the input unit 3. In this case, the detection sensitivity can be increased or decreased according to the numerical value to be input. In Step S4, two options whether or not the detection sensitivity is increased (that is, the detection sensitivity is not changed) or two options whether or not the detection sensitivity is decreased may be indicated.

Figure 4:
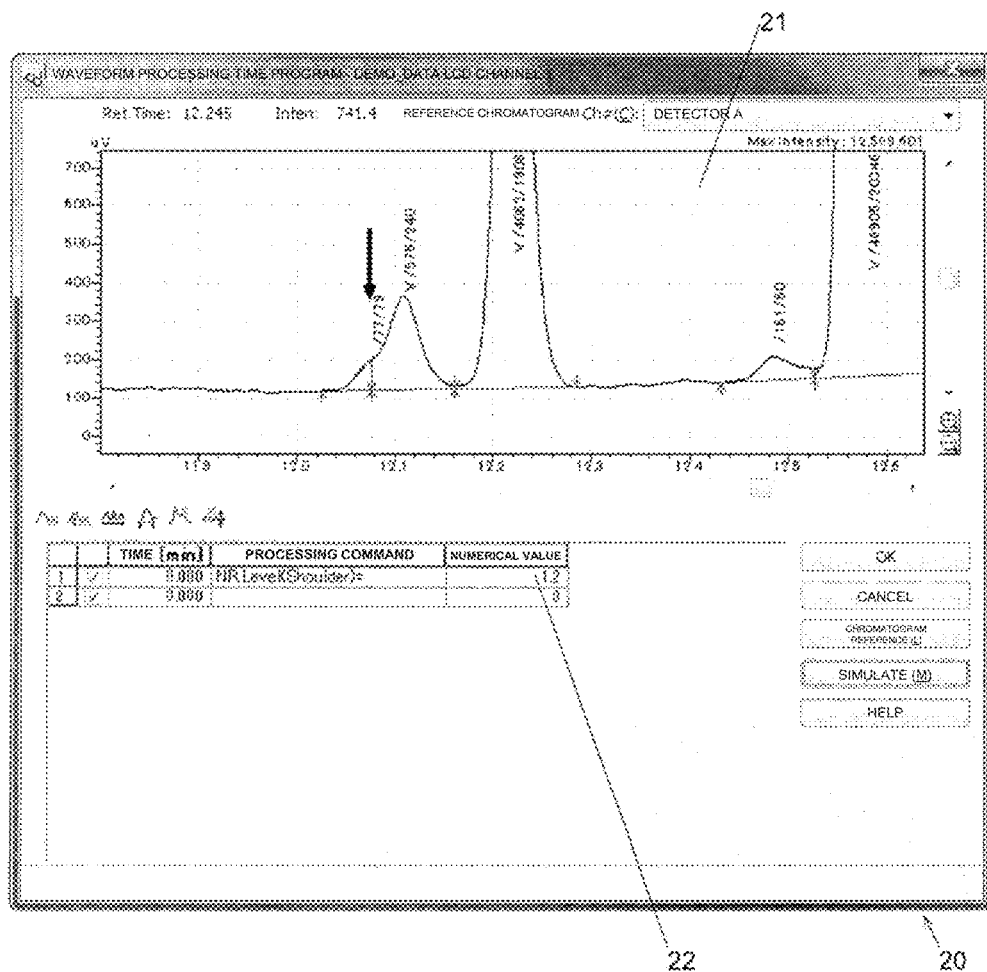
FIG. 4 is a diagram illustrating a screen of a display unit that displays an example of detection of a peak at a second detection sensitivity.

In the window 20 illustrated in FIG. 4, a processing command input part 22 is disposed under the chromatogram display 21. A user inputs the numerical value of detection sensitivity into the processing command input part 22 in a manner described below. The processing command input part 22 has three columns of "time," "processing command," and "numerical value." In an initial state, one set of input columns, into which three pieces of data are to be input, is displayed (see FIG. 3).

A retention time that is a start point of a range in which processing is performed is input in the column of the time. In the column of the processing command, one of a plurality of processing commands can be selected via a pulldown menu. In FIG. 4, a command "NRLevel(Shoulder)=" is selected to change the detection sensitivity. A numerical value after the change is input in the numerical value column. In terms of the processing command "NRLevel (Shoulder)=", in the case where only one combination of the retention time at a start point and numerical value of the detection sensitivity is input, processing is performed at the detection sensitivity over the entire range after the retention time at the start point (i.e., the whole retention time in the case where this is "0"). In the meantime, in the case where a plurality of combinations of the retention time at a start point and numerical value of the detection sensitivity are input, the detection sensitivity is switched to the detection sensitivity input part with the retention time at the start point every time the input retention time is reached, and thus, data processing is performed. Upon selection of a command "NRLevel(Shoulder)=AUTO" in the column of the processing command, the detection sensitivity after the retention time at the start point is automatically set (in this case, no numerical value is needed to be input in the column of the numerical value).

If a user selects No in Step S4, the processing comes to an end while regarding the determination result in Step S3 as being final. In contrast, if a user selects Yes in Step S4, a peak is detected with a second detection sensitivity based on the chromatogram (Step S5). The second detection sensitivity takes a numerical value input in the column of the numerical value by a user in the example illustrated in FIG. 4. However, the method for inputting the second detection sensitivity is not limited to this example. The second detection sensitivity may be set as a fixed value in place of inputting by a user.

Next, operations below are performed depending on whether the second detection sensitivity is higher (YES in Step S6) or lower (NO in Step S6) than the first detection sensitivity. Here. Step S6 may be automatically executed by the shoulder peak candidate/non-candidate choosing part 14 or by a user.

Figure 5A:
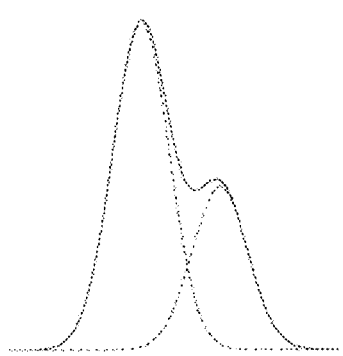
FIGS. 5A and 5B are charts illustrating examples of profiles of a chromatogram in which two peaks are superimposed one on another.
Figure 5B:
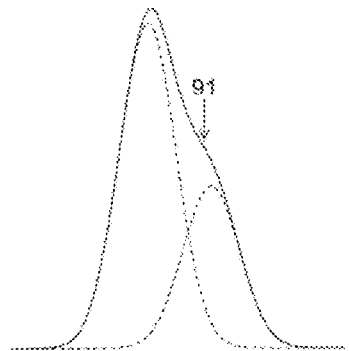

If the second detection sensitivity is higher than the first detection sensitivity, the shoulder peak candidate/non-candidate choosing part 14 chooses a peak that is not detected with the first detection sensitivity in Step S1 but is detected with the second detection sensitivity in Step S5 (Step S7-1). This step may be automatically executed by the shoulder peak candidate/non-candidate choosing part 14. Alternatively, the shoulder peak candidate/non-candidate choosing part 14 displays the two detection results in Steps S1 and S5 on the window 20, and then, a user may choose a shoulder peak candidate from the peak detected with the second detection sensitivity. Like the latter case, the final choosing of the shoulder peak candidate by a user can be readily achieved by comparing the two detection results, and furthermore, determination can be made at the same time, as described below. In the examples illustrated in FIG. 3 and FIG. 4, no numerical value or the like is displayed at a point indicated by a bold arrow in FIG. 3: in contrast, a numerical value and a fine arrow are displayed in FIG. 4. This means that there is a peak that is not detected with the first detection sensitivity (FIG. 3) but is detected with the second detection sensitivity (FIG. 4). This peak is represented in the chromatogram as a wave similarly to the example illustrated in FIG. 5B.

In contrast, in the case where the second detection sensitivity is lower than the first detection sensitivity, the shoulder peak candidate/non-candidate choosing part 14 chooses a peak that is detected with the first detection sensitivity in Step S1 but is not detected with the second detection sensitivity in Step S5 (Step S7-2). This step may be automatically executed or may be executed by a user based on the detection results displayed on the window 20.

After the processing in Step S7-1 or Step S7-2, it is determined whether the peak chosen by the shoulder peak candidate/non-candidate choosing part 14 is a shoulder peak or others than the shoulder peak such as noise in Step S8. This determination is visually made by a user in the present embodiment, like in Step S3. With the above-described processing, the peak detecting method in the present embodiment is finished.

The present invention is not limited to the above-described embodiment, and can be appropriately modified within the scope of the gist of the present invention.

REFERENCE SIGNS LIST

1 . . . Data Recording Unit
2 . . . Display Unit
3 . . . Input Unit
10 . . . Data Processing Device
11 . . . Chromatogram Creator
12 . . . First Peak Detecting Part
13 . . . Second Peak Detecting Part
14 . . . Shoulder Peak Candidate/Non-Candidate Choosing Part
15 . . . Detection Sensitivity Input Part 20 . . . Window Displayed on Display Device
21 . . . Chromatogram Display
22 . . . Processing Command Input Part
91 . . . Wave of Profile

The invention claimed is:

1. A peak detecting method using a computer having a central processing unit and a memory, comprising:
   a sample analysis step of analyzing a sample by a chromatograph, mass spectroscope, or optical spectroscope to obtain object data of the sample comprising a chromatogram, a mass spectrum, or an optical spectrometer;
   a first peak detecting step of detecting, with a first detection sensitivity, one or more peaks in the object data in which a peak is to be detected using the computer;
   a second peak detecting step of detecting one or more peaks in the object data with a second detection sensitivity that is higher than the first detection sensitivity, the one or more peaks detected in the second peak detecting step including a peak that is not detected in the first peak detecting step and is superimposed on another peak of the one or more peaks detected in the second peak detecting step;
   a shoulder peak choosing step of choosing, out of the one or more peaks detected in the second detecting step, the peak that is not detected in the first peak detecting step as a shoulder peak superimposed on the another peak; and
   a content determination step of determining that contents contained in the sample include a component corresponding to the shoulder peak.

2. The peak detecting method according to claim 1, wherein either one or both of the first detection sensitivity and the second detection sensitivity is set by a user.

3. A peak detecting method using a computer having a central processing unit and a memory, comprising:
   a sample analysis step of analyzing a sample by a chromatograph, mass spectroscope, or optical spectroscope to obtain object data of the sample comprising a chromatogram, a mass spectrum, or an optical spectrometer;
   a first peak detecting step of detecting, with a first detection sensitivity, one or more peaks in object data in which a peak is to be detected using the computer;
   a second peak detecting step of detecting one or more peaks in the object data with a second detection sensitivity that is lower than the first detection sensitivity, the one or more peaks detected in the first peak detecting step including a peak that is not detected in the second peak detecting step and is superimposed on another peak of the one or more peaks detected in the first peak detecting step;
   a non-shoulder peak choosing step of choosing, out of the one or more peaks detected in the first detecting step, the peak that is not detected in the second peak detecting step as noise and not a shoulder peak superimposed on another peak; and
   a content determination step of determining that the contents contained in the sample do not include a component corresponding to the noise.

4. The peak detecting method according to claim 3, wherein either one or both of the first detection sensitivity and the second detection sensitivity is set by a user.

5. An apparatus, comprising:
   a chromatograph, mass spectroscope, or optical spectroscope that analyzes a sample to obtain object data of the sample comprising a chromatogram, a mass spectrum, or an optical spectrometer; and
   a data processing device embodied by a computer having a central processing unit and a memory comprising
   a first peak detecting part for detecting, with a first detection sensitivity, one or more peaks in the object data in which a peak is to be detected;
   a second peak detecting part for detecting one or more peaks in the object data with a second detection sensitivity that is higher than the first detection sensitivity, the one or more peaks detected by the second peak detecting part including a peak that is not detected by the first peak detecting part and is superimposed on another peak of the one or more peaks detected by the second peak detecting part;
   a shoulder peak candidate choosing part for choosing, out of the one or more peaks detected by the second detecting part, the peak that is not detected by the first peak detecting part as a shoulder peak superimposed on the another peak;
   a content determination part for determining that the contents contained in the sample include a component corresponding to the shoulder peak.

6. An apparatus, comprising:
   a chromatograph, mass spectroscope, or optical spectroscope that analyzes a sample to obtain object data of the sample comprising a chromatogram, a mass spectrum, or an optical spectrometer; and
   a data processing device embodied by a computer having a central processing unit and a memory comprising:
   a first peak detecting part for detecting, with a first detection sensitivity, one or more peaks in the object data in which a peak is to be detected;
   a second peak detecting part for detecting one or more peaks in the object data with a second detection sensitivity that is lower than the first detection sensitivity, the one or more peaks detected by the first peak detecting part including a peak that is not detected by the second peak detecting part and is superimposed on another peak of the one or more peaks detected by the first peak detecting part; and
   a non-shoulder peak choosing part for choosing, out of the one or more peaks detected by the first peak detecting part, the peak that is not detected by the second peak detecting part as noise and not a shoulder peak superimposed on the another peak; and
   a content determination part for determining that the contents contained in the sample do not include a component corresponding to the noise.

* * * * *